United States Patent
Staiger

(10) Patent No.: US 7,916,117 B2
(45) Date of Patent: Mar. 29, 2011

(54) CIRCUIT ARRANGEMENT FOR FIELD UNIT

(75) Inventor: Holger Staiger, Lauterbach (DE)

(73) Assignee: Vega Grieshaber KG, Wolfach (DE)

( * ) Notice: Subject to any disclaimer, the term of this patent is extended or adjusted under 35 U.S.C. 154(b) by 884 days.

(21) Appl. No.: 11/639,110

(22) Filed: Dec. 13, 2006

(65) Prior Publication Data

US 2007/0161273 A1  Jul. 12, 2007

Related U.S. Application Data

(60) Provisional application No. 60/754,471, filed on Dec. 27, 2005.

(30) Foreign Application Priority Data

Dec. 27, 2005  (DE) .................. 10 2005 062 419

(51) Int. Cl.
G09G 3/36  (2006.01)
(52) U.S. Cl. ....................... 345/102; 345/211
(58) Field of Classification Search .......... 345/102, 345/440, 211–213; 439/151
See application file for complete search history.

(56) References Cited

U.S. PATENT DOCUMENTS

| | | | | |
|---|---|---|---|---|
| 5,063,379 A | * | 11/1991 | Fabry et al. ................ | 349/68 |
| 6,417,831 B2 | * | 7/2002 | Kashima .................... | 345/102 |
| 2002/0065631 A1 | | 5/2002 | Loechner | |
| 2003/0006989 A1 | * | 1/2003 | Konrad et al. ............. | 345/440 |
| 2004/0004424 A1 | | 1/2004 | Sakurai | |
| 2004/0104889 A1 | * | 6/2004 | Fehrenbach et al. ....... | 345/156 |
| 2004/0240193 A1 | | 12/2004 | Mertz et al. | |
| 2004/0257492 A1 | | 12/2004 | Mai et al. | |
| 2005/0044437 A1 | | 2/2005 | Dunstan et al. | |
| 2006/0007102 A1 | * | 1/2006 | Yasuoka et al. ............. | 345/102 |

FOREIGN PATENT DOCUMENTS

| | | |
|---|---|---|
| DE | 195 27 660 | 1/1997 |
| DE | 600 18 072 | 12/2005 |
| EP | 0 944 160 | 9/1999 |
| EP | 1 202 145 | 5/2002 |
| EP | 1 273 890 | 1/2003 |
| EP | 1 403 688 | 3/2004 |
| JP | 0 7 276 748 | 10/1995 |
| WO | 03/01775 | 1/2003 |

* cited by examiner

Primary Examiner — Stephen G Sherman
(74) Attorney, Agent, or Firm — Fay Kaplun & Marcin, LLP

(57) ABSTRACT

A lighting arrangement for a field unit screen is provided. The lighting arrangement comprises a circuit arrangement for a field unit with a power measuring device, a power distribution device, and a luminous device. The power measuring device and the power distribution device are adapted for determining an existing power and forwarding a surplus power to a screen light drive device. The screen light drive device determines whether the existing power is sufficient for lighting, and drives a luminous device when sufficient power is available. The luminous device comprises a light distribution device and a light generating device.

10 Claims, 10 Drawing Sheets

US 7,916,117 B2

CIRCUIT ARRANGEMENT FOR FIELD UNIT

REFERENCE TO RELATED APPLICATIONS

This application claims the benefit of the filing date of the German Patent Application Serial No. 10 2005 062 419.7 filed Dec. 27, 2005 and the U.S. Provisional Patent Application Ser. No. 60/754,471 filed Dec. 27, 2005, the disclosures of which are hereby incorporated herein by reference.

FIELD OF THE INVENTION

The present invention relates to a circuit arrangement for a field unit, a luminous device for a field unit screen module, an lighting arrangement for a field unit screen, a method for driving a luminous device for a field unit screen, a computer-readable medium with a program for driving a luminous device for a field unit screen and a program element with a program for driving a luminous device for a field unit screen.

TECHNICAL BACKGROUND OF THE INVENTION

Frequently, display devices or screens for reading measurement values of a field unit, sensor or measuring instrument have low contrast in relation to the environment. Thereby, the screens, in particular the display, become difficult to read especially under poor lighting conditions. Frequently, the displays have to be mounted at locations where little light is available, so that reading the display often proves difficult and inconvenient.

As measuring instruments are frequently used at distant locations where no power supply is available, supplying power to displays for measuring instruments is problematic.

SUMMARY OF THE INVENTION

The present invention relates to operation of a field unit more efficiently.

Accordingly, a circuit arrangement for a field unit, a luminous device for a field unit screen, a lighting arrangement for a field unit screen, a method for driving a luminous device for a field unit screen, a computer-readable medium with a program for driving a luminous device for a field unit screen module, and a program element with a program for driving a luminous device for a field unit screen are created.

According to an exemplary embodiment of the present invention, a circuit arrangement for a field unit is provided. The circuit arrangement has a power measuring device, which is arranged for determining a power existing in a field unit. Furthermore, the circuit arrangement has a power distribution device, the power distribution device being arranged for determining whether surplus power exists in the field unit for operating a screen light. Furthermore, the power distribution device is arranged for forwarding the surplus power to a screen light drive device.

According to another exemplary embodiment of the present invention, a luminous device for a field unit screen module is proposed. The luminous device has a light distribution device, in particular an optical waveguide and a light generating device. The light distribution device is arranged for distributing the light in space. The shape of the light distribution device is adapted to a rear side of the field unit screen module, wherein the light distribution device can be illuminated. The light distribution device is arranged for distributing incident light evenly over the field unit screen module. The light distribution device can be illuminated by means of the luminous device.

According to another exemplary embodiment of the present invention, a lighting arrangement for a field unit screen is proposed. The lighting arrangement comprises a circuit arrangement having the above-mentioned features, and a luminous device. The circuit arrangement is coupled with the screen light drive device, and the screen light drive device in turn is coupled with the luminous device, in particular with the light generating device of the luminous device.

According to another exemplary embodiment of the present invention, a method for driving a luminous device for a field unit screen is proposed, the method comprising measuring of an existing surplus power, determining whether the existing surplus power is sufficient for lighting and subsequent driving of the luminous device, in particular a light generating device of a luminous device, for operating the luminous device with the existing surplus power, when it has been determined that the existing surplus power is sufficient for lighting.

According to yet another exemplary embodiment of the present invention, a computer-readable medium is provided, wherein a computer program for driving a luminous device for a field unit screen is stored, which, upon execution by a processor, comprises measuring of an existing surplus power, then determining whether the existing surplus power is sufficient for lighting, and finally driving a luminous device, in particular a light generating device, for operating the luminous device with the existing surplus power, when it has been determined that the existing surplus power is sufficient for lighting.

According to yet another exemplary embodiment of the present invention, a program element for driving a luminous device for a field unit screen is proposed, which, upon execution by a processor, comprises measuring of an existing surplus power, then determining whether the existing surplus power is sufficient for lighting, and finally driving a luminous device, in particular a light generating device, for operating the luminous device with the existing surplus power, when it has been determined that the existing surplus power is sufficient for lighting.

According to an exemplary embodiment of the present invention, energy saving operation of a field unit screen light can be enabled.

For setting and passing a measurement value on to a control room, an external voltage source of an external electric circuit can be converted by means of load adjustment into a current so that the current in the external current loop corresponds to a measurement value. In a 4-20 mA measuring system, a measurement value of a field unit, measuring instrument or sensor of a control device, e.g. a microprocessor, can be adjusted so that the current varies in a range from 4 to 20 mA. Herein, e.g. in level measuring, the current value of 4 mA could correspond to a lowest filling level, and the current value of 20 mA to a highest filling level.

As the external voltage source can have a constant value, the current variation can be performed by means of the adjustment of load resistors. In this case, power can be consumed on purpose at a resistor in order to force a current corresponding to the filling level value.

Depending on the current to be displayed, more or less power can thus be produced in a field unit for consumption. On the one hand, this power surplus can be used in the field unit for supplying power to the field unit, in particular the electronic assemblies existing in the field unit. However, it may also happen that there is more power available than required for internal function supply, which would then have to be consumed artificially.

The power reserves existing for a current measurement value can be determined by means of a power measuring device, and in case of surplus power, this power can be used for supplying additional functions. For this purpose, the surplus power can be quantified by means of a power distribution device, and in case of sufficient surplus, handed over to an additional assembly. Such an additional assembly can be a screen light, which can make use of the surplus power for screen lighting.

The surplus power can be made available for a screen light drive device, which in turn can determine whether the power provided is sufficient for the luminous device to be driven. If the screen light drive device determines that the power distribution device is making sufficient power available therefore, then it can pass this power on to a luminous device, whereby the luminous device can convert the power into light and illuminate the screen.

For specific lighting of the screen, the luminous device can have a light distribution device, in particular an optical waveguide, the shape of the light distribution device or the optical waveguide being adapted to the shape of the screen. As seen in a reading direction, the light distribution device can be mounted behind the field unit screen and illuminate the screen, in particular the readout values, from behind. Thereby, the represented values or symbols can stand out. The shape adapted to the field unit screen can ensure even light distribution over the screen. The luminous device can have a light generating device, which can for instance convert electrical current into light. The light generated by the light generating device can be distributed over the screen by means of the light distribution device.

The light generating device can be located laterally from the light distribution device. In other words, the light generating device can be disposed at an angle, e.g. 90°, as seen from a viewing direction onto the screen. From this lateral position, the light generating device can feed light into the light distribution device. I.e. the light can spread first of all in parallel to the field unit screen inside the light distribution device, in order to then illuminate the screen, after rotation by 90° opposite to the viewing direction onto the screen. For this purpose, the light distribution device is arranged so as to turn the beam path of the light in the direction of propagation before lighting.

In order to avoid turning the light, the light generating device can be disposed behind the screen, as seen in a reading direction of the screen. When illuminating, the light distribution device evenly distributes the light irradiated from behind so that a uniform illumination of the display can be performed.

It is also possible for the light distribution device to generate incident light onto the front side of the screen and thus facilitate reading of symbols on the screen.

Hereafter, further exemplary embodiments of the circuit arrangement for a field unit will be described. Such exemplary embodiments also apply for the lighting arrangement for a field unit screen, for the method for driving a luminous device for a field unit screen, for the computer-readable medium, wherein the computer program for driving a luminous device for a field unit screen is stored, and for the program element for driving a luminous device for the field unit screen.

According to another exemplary embodiment of the present invention, the circuit arrangement is arranged for forwarding a field unit surplus power. This surplus power can come from the power supply of a HART® 2-conductor field unit, a HART® 4-conductor field unit, a 4-20 mA field unit, a Profibus field unit or a Fieldbus Foundation field unit. The power can then be drawn via the measurement value signal line. Thus, it can be avoided to provide additional power for field unit screen supply. The number of lines to the field unit can be reduced, whereby lines can be saved. Conventional line lengths for field unit feed lines can be in the range of 10 m to 100 m, 100 m to 800 m, or e.g. 500 m to 3000 m.

According to another exemplary embodiment of the present invention, a circuit arrangement is provided, wherein the power distribution device has an explosion-proof device. This explosion-proof device can reside in the use of resistors for current limitation. The installation of an explosion-proof device allows for the circuit arrangement to be operated in an explosion-risk area. An explosion-risk area is a local area, in the surrounding area of which special arrangements have to be made in order to avoid explosions. Explosion-risk areas are classified into various classes of protection, and by means of using resistors the circuit arrangement can be adapted so as to be arranged for use in an explosion-risk area.

According to yet another exemplary embodiment of the present invention, a circuit arrangement is proposed, wherein the power distribution device is further arranged for activating the screen light drive device.

Consequently, communication between the screen light drive device and the circuit arrangement can take place, and thus the presence of sufficient power can be transmitted directly to the screen light drive device.

According to another exemplary embodiment of the present invention, a circuit arrangement is provided, which has a screen light drive device. The screen light drive device determines whether an existing or provided or existing surplus power is sufficient for lighting, and drives a luminous device when a sufficient amount of power is available.

It can thus be determined whether sufficient power is available for operating the luminous device. If other functions with higher priority are present, it can be avoided that a function with a higher priority breaks down due to screen lighting. When sufficient power is not available, breakdowns of undersupplied fluctions may occur.

According to another exemplary embodiment, the screen light drive device further has a constant-current source and/or a PWM (pulse width modulation) drive device.

By means of the constant-current source, even lighting of the screen can be achieved. Flickering due to variable power supply can thus be substantially avoided. By means of a so-called step-up device, it is possible e.g. to increase the voltage for a luminous device in order to avoid flickering of the light.

According to another exemplary embodiment of the present invention, the screen light drive device further has a light selection device, the light selection device being arranged for detecting whether lighting is to take place. This may be a switch, allowing a user to illuminate the screen light drive device.

The screen light drive device is further arranged so as to drive the luminous device only when sufficient power is available and when it detects by means of the light selection device that a display is to take place.

By means of the light selection device, a screen light can only be switched on when the screen is to be read. During the rest of the time, the power can either be buffered or made available to other additional components.

According to yet another exemplary embodiment of the present invention, a circuit arrangement is proposed, wherein the screen light drive device further comprises a power storage. The power storage is arranged for surplus power or energy to be stored.

The power storage can be for instance a capacitor with high capacity, e.g. 1000 µF, with a capacity in the range of 100 µF to 500 µF, or in the range of 1 µF to 100 µF. This capacitor can be used as an accumulator, and can be charged for a time in which surplus power is available, in order to store the power which is at first a surplus and make it available at a later time. When a high measurement value is transmitted on the measurement line, high power consumption can be required from the field unit, in order to dissipate the power. Instead of dissipating the power, the power can be delivered to the power storage device.

Even the time for which the screen, in particular the screen light, is switched off by means of the light selection device can be used to store surplus power and fetch it subsequently.

According to yet another exemplary embodiment of the present invention, a circuit arrangement is proposed, wherein the screen light drive device has an explosion-proof device. By means of the explosion-proof device, e.g. by means of resistors, the screen light drive device can be adapted to requirements of explosion protection.

Hereafter, further exemplary embodiments of the luminous device will be proposed. Such exemplary embodiments are to be applicable also for the lighting arrangement.

According to another exemplary embodiment of the present invention, the luminous device is arranged for use with a removable field unit screen module. E.g., the luminous device together with the screen module can be removed from a field unit case.

According to another exemplary embodiment of the present invention, the luminous device is arranged for operation with a field unit chosen from the group composed of a radar field unit, a TDR field unit, an ultrasound field unit, a capacitive field unit, and a limit level field unit.

A capacitive field unit can determine measurement values via the determination of a capacity varying according to a measurement. A TDR field unit (Time Domain Reflectometry) determines measurement values using reflections. This may be a method for determining and analyzing propagation lengths and reflection characteristics of electromagnetic waves and signals.

According to another exemplary embodiment of the present invention, the light distribution device has a holding device for the field unit screen module. By means of the holding device, the screen module can be positioned on the luminous device, in particular the light distribution device, and maintained in a certain position. Thereby, an even light distribution over the surface of the screen module can be obtained. Furthermore, shifting of the screen module with respect to the light distribution device can be prevented.

A field unit screen, which may also be detachable, can have several components. E.g. a field unit screen can comprise a field unit screen case, a drive board, and a field unit screen module. The drive board processes signals so that the desired information appears on the field unit screen. For this purpose, the drive board drives e.g. individual pixels of the screen module. By means of a holding device, shifting of the components with respect to each other can be avoided.

A field unit screen can be a matrix screen module, a TFT screen, a grey level screen, a color screen, an OLED, a PLED or an LCD screen module. The terms field unit screen module, screen module, LCD screen, LED screen module or LC screen module are used as equivalents.

According to another exemplary embodiment of the present invention, a luminous device is proposed, wherein the light distribution device, as seen in a viewing direction onto the screen module, can be mounted behind the screen module. Mounting can be done e.g. by means of gluing. With gluing, the support of the light distribution device on or behind the screen can be ensured in non-slip manner.

According to yet another exemplary embodiment of the present invention, a luminous device with a light distribution device is proposed, wherein the light distribution device is equipped with prisms. By means of the prisms, which act as lenses, the light, which is distributed on the screen module, can be focalized onto certain areas. Thereby, a clearer reading of the display of the screen module can be obtained.

According to another exemplary embodiment of the present invention, a luminous device is proposed, wherein the light generating device is a LED (light emitting diode). A LED can be a component for electro-optical conversion, wherein a current is converted into a light signal of a certain wavelength. A LED can have low power consumption, but high light efficiency. It is also possible to implement a plurality of LEDs. The possible number of useable LEDs can depend on the power required from each individual LED. E.g., a LED array can be formed.

According to yet another exemplary embodiment of the present invention, the LED is arranged so as to provide white light. White light can contain all spectral colors, and can thus allow for proper reading of a screen, in particular of a color or color reproducing screen. A white LED can have a brightness class ranging from a minimum of 360 mcd to a maximum of 1000 mcd (mcd=millicandela) at 20 mA. A white LED can also originate from class T, with brightness class T ranging from 720 mcd to 1000 mcd. Sufficient brightness can also be achieved by means of a LED of brightness class S in the range from 500 mcd to 720 mcd. LEDs of class R from 360 mcd to 500 mcd can also be implemented. However, LEDs with a luminous power of more than 1000 mcd can also be implemented.

According to yet another exemplary embodiment of the present invention, the light distribution device is a semi-reflective foil. With a semi-reflective foil, incident light is deflected so that it can serve for background lighting of the screen.

Hereafter, an illustrative aspect of the present invention will be described more in detail.

The present invention can be an add-on kit for a field unit, in particular for a field unit screen or screen module of a field unit. Herein, a single white LED can illuminate the screen. The LED can irradiate laterally into an optical waveguide, with the optical waveguide distributing the light evenly over the display. For sufficient light distribution, the optical waveguide can have a thickness of about 2 mm. However, the thickness can also be within the range of 2 mm to 8 mm.

The LCD screen can be solidly soldered to a support circuit board. Thereby, space can be created for the additional light distribution device. The method for operating the display can be adapted so that the luminous device can be switched off.

The method for operating an existing field unit, measurement instrument or sensor can also be adapted to introduce the lighting operation. The sensor can determine the power at the disposal thereof and determine therefrom whether the screen light, in particular the luminous device, is switched on or off. Determining whether sufficient power is available can be done by means of the measurement of a supply voltage. Increased current consumption can occur at explosive-proof resistors between a sensor and a field unit screen. At the explosive-proof resistors, e.g. 0.25 V can be released.

The field unit screen can have a 4-fold voltage multiplier, transforming e.g. a 3V-voltage into a 12V-voltage. The luminous device can be operated using a constant-current source and/or a PWM drive. A current across the luminous device, in particular the light generating device, and further in particular across the LED, can be in the range from 1 mA to 1.5 mA. The power consumption of a lighting arrangement can amount to 5 mW. Due to power release, there may be less energy available for a processor of the field unit, whereby runtime or signal processing time can be reduced.

On and off switching of the light can be done in that the light is always off when the sensor is switched on, regardless whether lighting is activated or deactivated. Power measurement can be performed in the main program only and not in the boot straps. Lighting can be activated only after a power measurement has taken place, and sufficient power is available. The lighting can be activated and deactivated by a user via an input device of the screen or a remote control terminal.

In shipping condition of the screen light, lighting can be either activated or deactivated. When the power measurement determines too little power, lighting can be deactivated. When sufficient power is then available again, lighting can be activated again. If a user tries to activate lighting and it has previously been deactivated by the power measurement, a warning can be inserted.

In a low-power mode, emergency lighting can be performed.

BRIEF DESCRIPTION OF DRAWINGS

Hereafter, advantageous exemplary embodiments of the present invention will be described with reference to the figures.

DETAILED DESCRIPTION OF EXEMPLARY EMBODIMENTS OF THE INVENTION

The illustrations in the figures are schematic and not to scale. In the following description of the FIG. 1 to 13, the same reference symbols will be used for identical or corresponding items.

Figure 1:
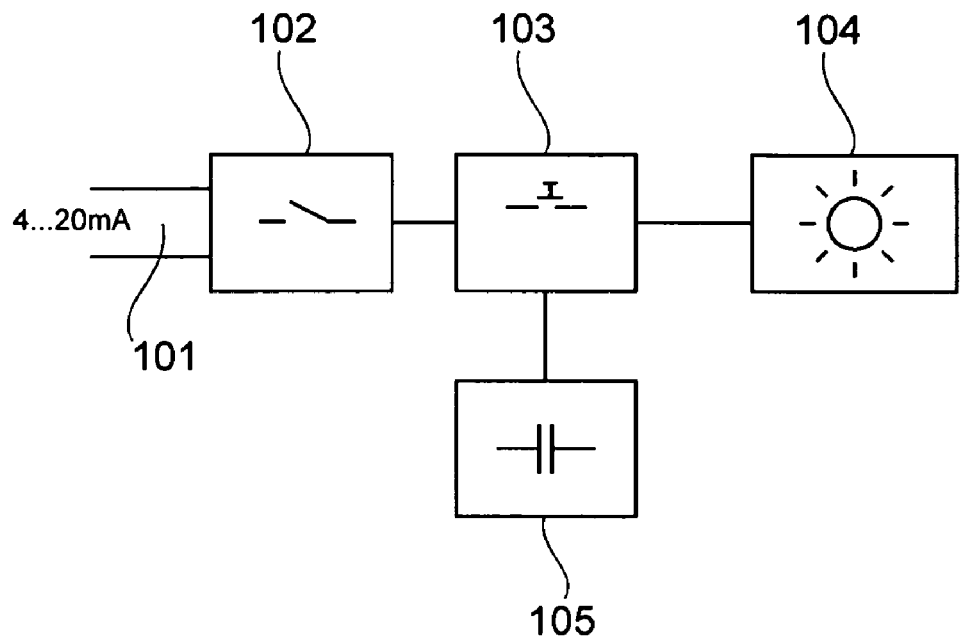
FIG. 1 shows a block diagram of a lighting arrangement for a field unit according to an exemplary embodiment of the present invention.

FIG. 1 shows a block diagram of a lighting arrangement for a field unit according to a exemplary embodiment of the present invention. Via the measuring bus 101, a current according to a measurement value to be displayed is made available for a measuring instrument, not shown in FIG. 1. The blocks 102, 103, 104, and 105 symbolize an add-on or additional module for the measuring instrument for illuminating a screen of the measuring instrument or field measuring instrument.

Hereafter, the function of the individual blocks will be explained. Reference numeral 102 designates a field unit power determination device. This field unit power determination device monitors the power available via the measuring bus or the secondary control loop 101. The field unit power determination device 102 determines that additional power is provided via the measuring loop 101, which is not required for supply of the field unit. And when the power is available for operating a screen lighting device 104 or a luminous device 104, the field unit power determination device 102 forwards the surplus power to the screen light drive circuit 103. The screen light drive device 103 can measure the power made available thereto, and determine whether the power is sufficient for supplying the luminous device 104. However, the screen light drive device 103 can also receive information concerning the power level via a signal of a power distribution device in the field unit power determination device 102.

The screen light drive device 103 can determine whether a field unit screen is to be lighted. This determination can be performed by means of an input from a user. If sufficient power is available for operating the screen light 104 or the lighting device 104, and screen lighting is desired, then the screen light drive device 103 can activate the luminous device 104.

Even if insufficient power is provided by the field unit power determination device 102, the screen light drive device 103 can draw required power for the luminous device 104 from a power storage 105. For this purpose, the screen light drive device 103 decides, also by means of a measurement, whether sufficient power respectively energy is present in the power storage 105.

If sufficient power is made available by the field unit power determination device 102, but momentarily no display or lighting of a display is required, the screen light drive device 103 can release the surplus power to the power storage 10, and thus store it for a later time. Due to measuring of the existing power and determination whether the power is at present required or to be placed into a power storage 105, the screen light drive device 103 is capable of performing power or energy management.

Figure 2:
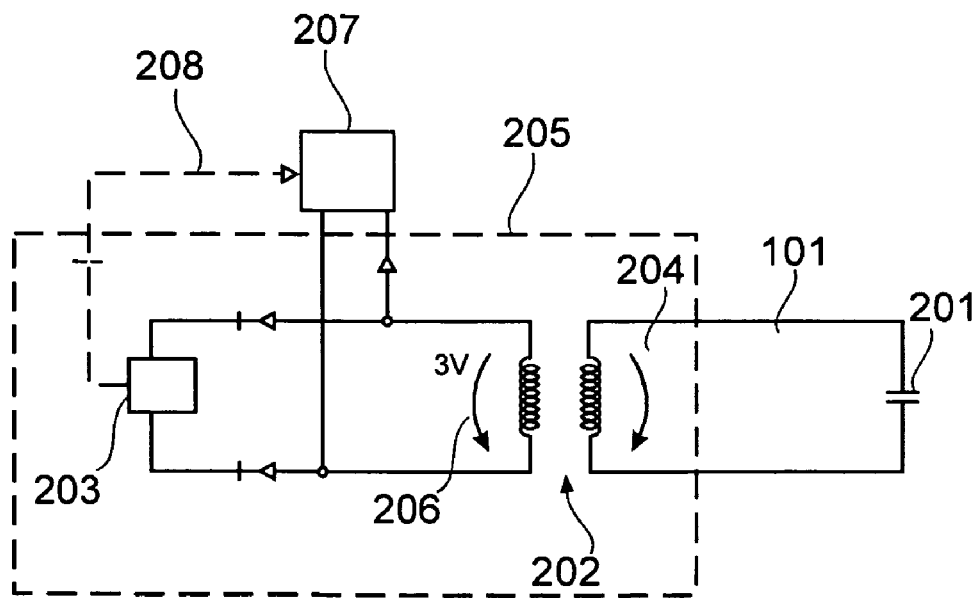
FIG. 2 shows a simplified block diagram for a field unit with a lighting arrangement for a field unit screen according to an exemplary embodiment of the present invention.

FIG. 2 shows a schematic block diagram for a field unit with a lighting arrangement for a field unit screen according to an exemplary embodiment of the present invention. FIG. 2 shows the measuring bus 101, which is configured as a 4-20 mA 2-wire HART® bus. The power supply 201, voltage supply 201, or current supply 201 provides a voltage of e.g. 20 V. The microprocessor 203 then regulates via the measurement current adapting device 202 the line-side voltage drop 204 or the bus-side voltage drop 204 so that the current in the measuring loop 101 corresponds to a measurement value measured by the measuring instrument 205 or the field unit 205 or the sensor 205.

In the measurement current adapting device 202, power dissipation for current adaptation is taking place. The measurement current adapting device 202 has a transformer. By means of the inversion of the continuous current in the measuring loop 101 the current can be transmitted via the transformer to the measurement current adapting device 202. At the field unit side of the measurement current adapting device 202, a constant voltage of 3 V 206 is maintained. Connecting additional consumers dissipates surplus power.

The microprocessor 203 can determine the power available in excess and drive the screen light drive device 207 via the drive line 208, and thereby inform it of the power existing in excess. The screen light drive device 207 in turn can determine the surplus power and use it for driving a screen light not shown in FIG. 2.

The length of the measuring bus loop 101 can be up to 4 km. In a digital HART® polling mode, 4 mA are constantly provided in the measuring loop 101. The surplus power depends on the choice of the level of the voltage source 201. For a HART® bus, the minimum voltage of the voltage supply 201 is 15 V, for a Profibus, the minimum voltage is 10 V.

Figure 3:
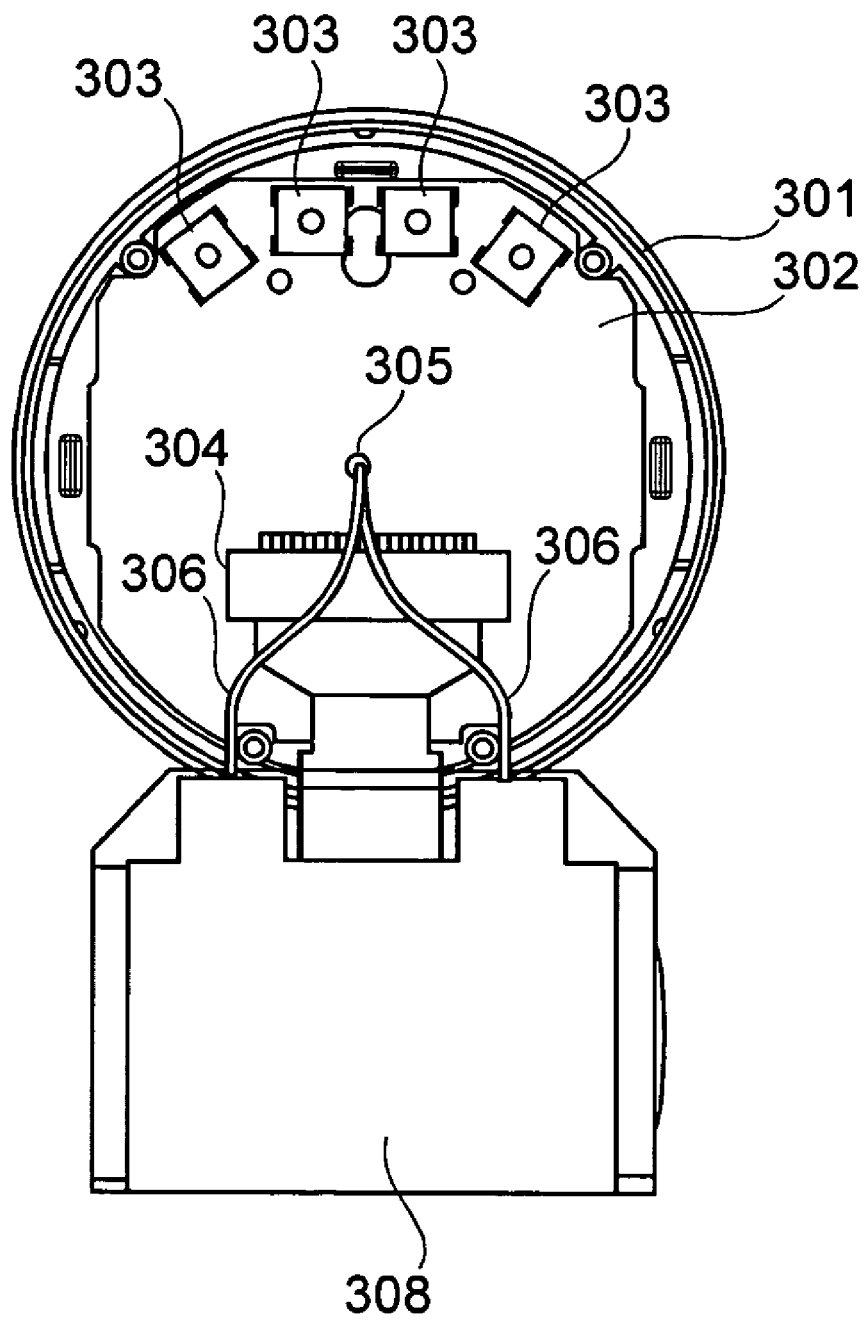
FIG. 3 shows a rear view of a field unit screen with a luminous device in an unfolded state according to an exemplary embodiment of the present invention.

FIG. 3 shows a rear view of a display with a luminous device in an unfolded state according to an exemplary embodiment of the present invention. The case 301 of the field unit screen has a circular shape. The screen board 302 is adapted to the circular shape of the screen case 301 and has four input devices 303 for input of user information.

Furthermore, the circuit board 302 has a connector plug 304, by which the screen module, e.g. an LCD screen, is connected to the circuit board 302.

The light generating device illuminates the light distribution device 308 laterally. The light distribution device distributes the light of the light generating device on the bottom side of the LCD screen, also not shown in FIG. 3. The light distribution device 308 is thus located between the circuit board of the drive board 302 and the LCD screen.

Figure 4:
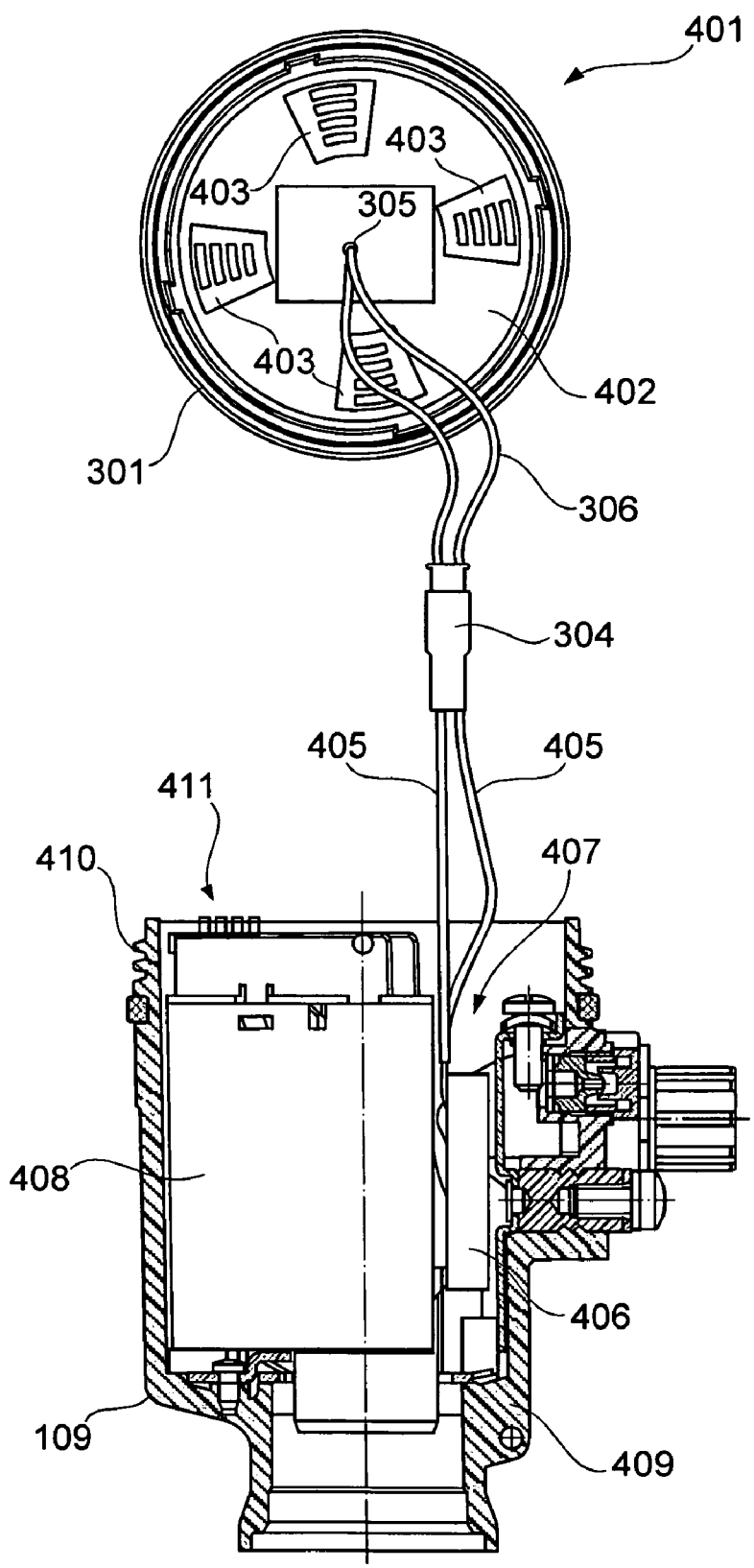
FIG. 4 shows a sectional illustration of a measuring instrument with screen and additional module for a lighting arrangement for a field unit screen according to an exemplary embodiment of the present invention in a disassembled state.

FIG. 4 shows a measuring instrument with a screen and an additional module for a lighting arrangement according to an exemplary embodiment of the present invention in a disassembled state. The field unit screen 401 is shown in a rear view with the luminous device installed (not visible in FIG. 4). The field unit screen 401 has the case 301, and the rearward termination 402 of the screen 401 has the signal ports 403. The signal ports 403 can contact the spring contacts 411. The power for the light, in particular for the luminous device, is obtained like the signals for the screen via the contacts 403 visible in FIG. 4.

The field unit power determination device and the screen light drive device are housed in the electronic insert 408.

Sensor typical functions are realized in the measuring instrument insert 408. The screen light represents an additional function, which can be housed in the additional module 406. The additional module 406 is linked to the electronic insert 408 via connection lines, not shown, whereby e.g. communication between the screen light drive device 207 and the microprocessor 203 can take place.

The field unit screen 401 can be snapped on by means of a bayonet fixing onto the electronic insert 408, so that the contact surfaces 403 contact the spring contacts 411. Thereby, information transmission, e.g. concerning information to be represented, can take place between the electronic insert 408 and the screen 401.

Figure 5:
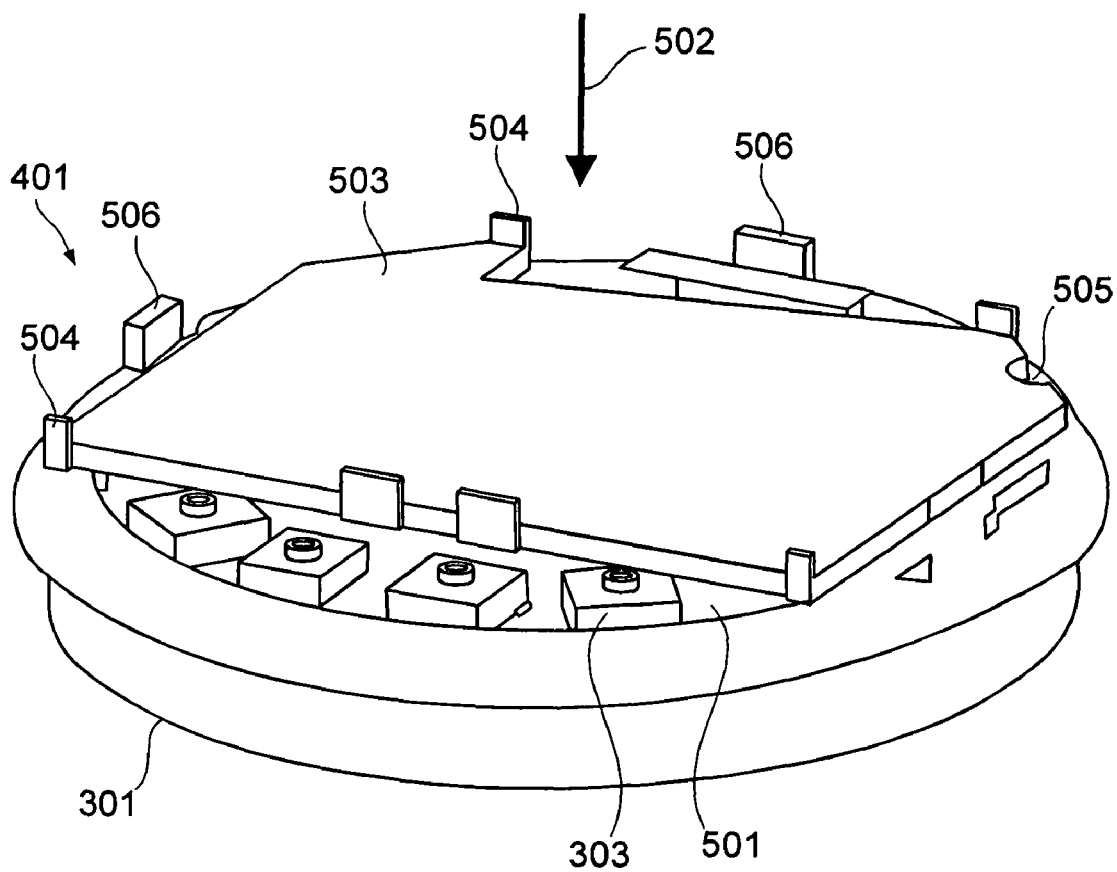
FIG. 5 shows a perspective illustration of a screen holder with a light distribution device according to an exemplary embodiment of the present invention.

FIG. 5 shows a perspective illustration of a screen holder with a light distribution device according to an exemplary embodiment of the present invention. FIG. 5 shows part of the screen 401. Within the screen case 301, the circuit board 501 for processing screen information is arranged. The light distribution device 503 is arranged as a screen holder. The light distribution device is configured as a plane optical waveguide. Four input elements 303 are disposed on the circuit board 501.

The case retainers 506 are for fixing the light distribution device 503 and the LCD screen respectively display module, not shown. Reading of the screen is done in the screen reading direction 502. As seen in reading direction 502, above the circuit board 501, the light distribution device 503 is represented. The light distribution device has retainers 504 facing in parallel direction to the reading direction 502. These retainers 504 are arranged for receiving an LCD screen. Instead of an LCD screen, any other type of screen module can be used, which is configured for converting electric signals into reproducible symbols. Driving the screen module is done via the circuit board 501.

The light distribution device 503 has a notch 505 on one side. The notch 505 is adapted to receive a LED, irradiating laterally into the light distribution device 503, and to couple the light generated by the LED into the light distribution device. The light spreading from the notch 505 into the light distribution device 503 leaves the light distribution device 503 by being distributed over the whole area, opposite to the viewing direction 502 from the light distribution device 503. Thereby, the light goes through the LCD screen, not shown.

Figure 6:
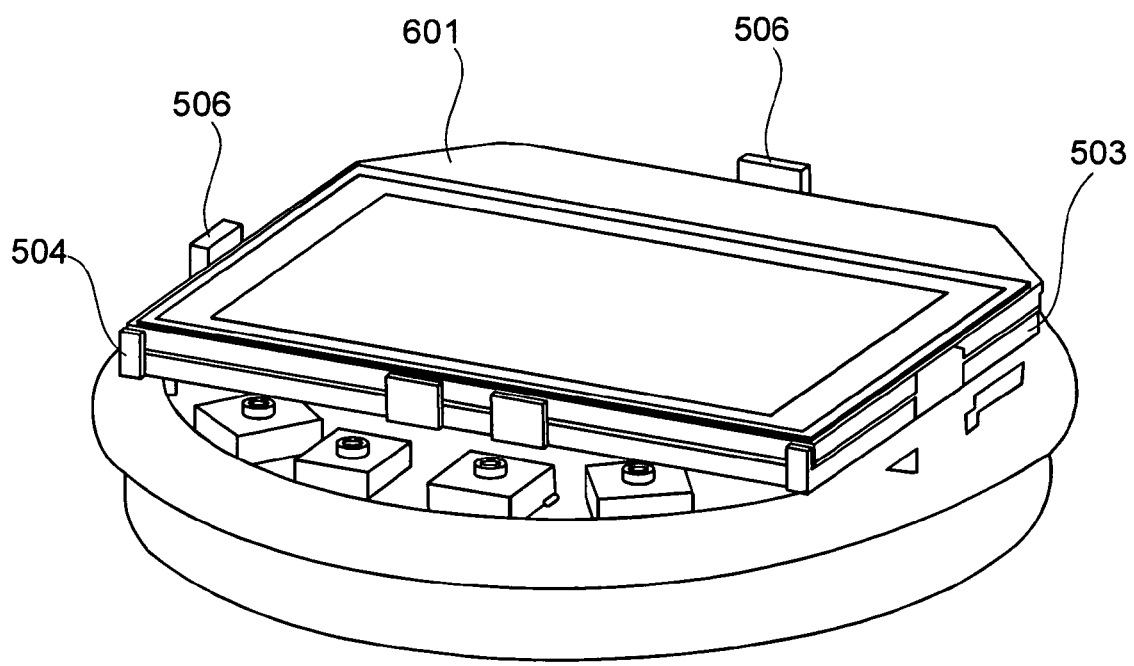
FIG. 6 shows a perspective illustration of a screen holder with a light distribution device and a field unit screen according to an exemplary embodiment of the present invention.

FIG. 6 shows a perspective illustration of a screen holder with a light distribution device and a screen module according to an exemplary embodiment of the present invention. FIG. 6 corresponds to FIG. 5. However, in comparison with FIG. 5, the LCD screen or screen module 601 is represented. The shape of the light distribution device 503 is visibly adapted to the shape of the screen module 601. The retainers 504 encase the screen module 601 so that secure holding of the screen module 601 on the light distribution device 503 is ensured. Thereby, shifting of the screen module 601 on the light distribution device 503 can be prevented. The retainers 504 can also be configured as snap-on fasteners.

Figure 7:
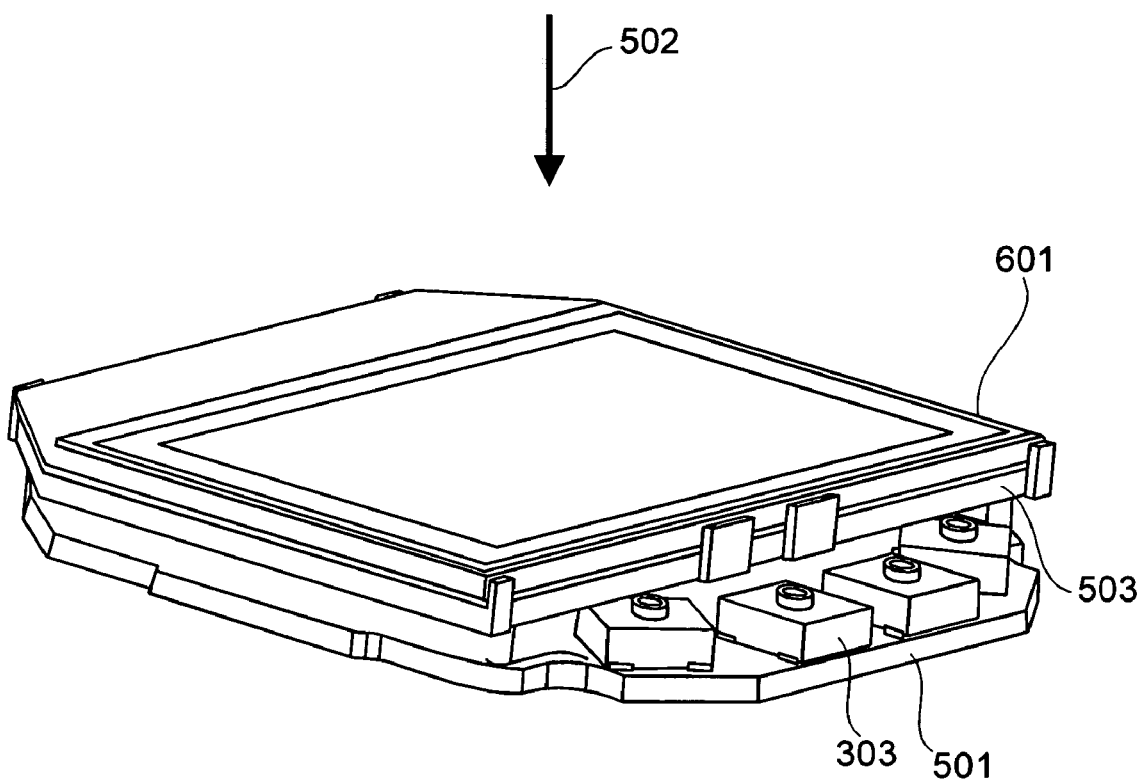
FIG. 7 shows another perspective illustration of a screen holder with a light distribution device and a screen module according to an exemplary embodiment of the present invention.

FIG. 7 shows a perspective illustration of a screen holder according to an exemplary embodiment of the present invention. For better illustration of the components, no case is shown in FIG. 7. FIG. 7 shows the layered structure of the circuit board 501 with the input devices 303, the light distribution device 503, and the screen module 601. As seen in viewing direction 502, the circuit board 501 is located underneath the light distribution device 503 and the light distribution device 503 underneath the screen module 601. Thereby, light from the light distribution device 503 can illuminate the screen module 601 from the back as backlighting.

Figure 8:
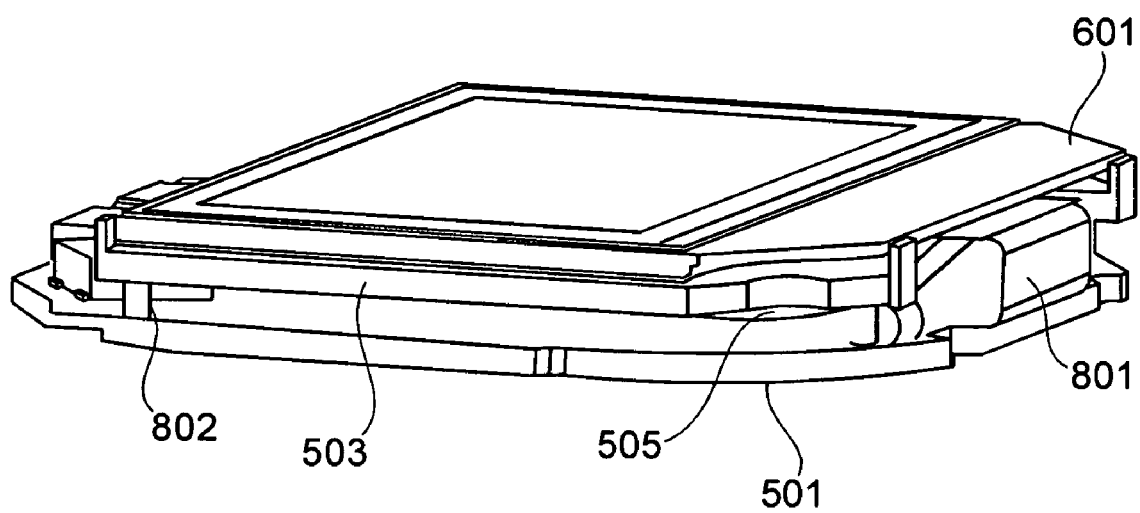
FIG. 8 shows another perspective illustration of a screen holder with a light distribution device and a screen module according to an exemplary embodiment of the present invention.

FIG. 8 shows another perspective illustration of a screen holder with a light distribution device and a screen module 601 according to an exemplary embodiment of the present invention. FIG. 8 shows the flexible connector 801 whereby display information is passed on from the drive board 501 to the screen module 601. The screen module 601 can only represent information provided thereto. The evaluation and the way the information is represented is handled by means of the electronics located on the circuit board 501. The circuit board 501 is thus the drive or driver circuit for the screen module 601.

The light distribution device 503 is located between the screen module 601 and the driver circuit board 501. Also visible in FIG. 8 is the notch 505 for lateral illumination of the light distribution device 503. By means of the spacer 802, a space between the light distribution device 503 and the circuit board is ensured.

Figure 9:
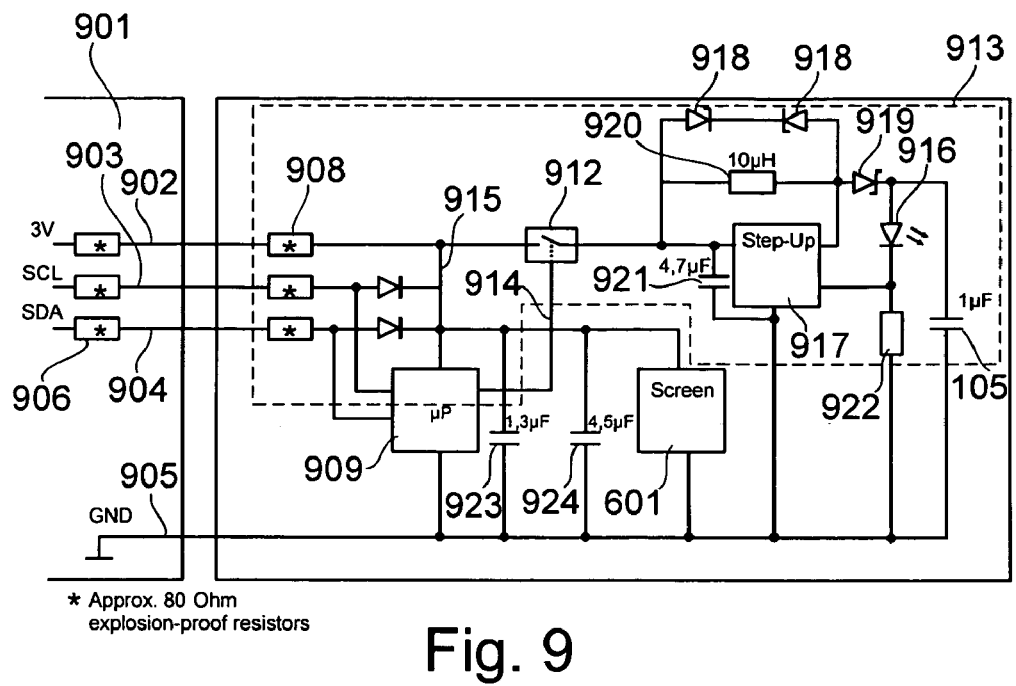
FIG. 9 shows a block diagram of a circuit arrangement for a field unit according to an exemplary embodiment of the present invention.

FIG. 9 shows a block diagram of a circuit arrangement for a field unit according to an exemplary embodiment of the present invention. Only the four lines 902, 903, 904, and 905 of the sensor 901 respectively the field unit 901 are shown. The lines 902, 903, 904, and 905 represent the lines of a serial bus. Line 902 is for transmitting the 3 V supply voltage, whereas line 905 is for the corresponding ground connection. Clock information is transmitted via the SCL (serial clock) line. Existing data are transmitted via the SDA (serial data) line 904. Lines 902, 903, and 904 respectively have an explosion-proof resistor 906. This explosion-proof resistor allows for operation of the circuit in an explosion-risk area.

Lines 902, 903, 904, and 905 lead to the field unit screen 907. The circuit illustrated in block 907 represents the driver circuit for the LCD screen module 601. Lines 902, 903, and 904 also have explosion-proof resistors 908 at the screen light drive device side 907. Line 904 transmits SDA data (serial data) to the microprocessor 909. In addition to the data via line 904, the microprocessor 909 also receives clock information via line 903. Furthermore, the microprocessor 909 is connected to the 3 V direct voltage of line 902.

The microprocessor 909 provides the processed display information for the LCD screen 601. For this purpose, the microprocessor 909 is linked to the LCD screen 601, wherein capacitors 923 and 924 are connected in parallel to the LCD screen 601 and the microprocessor 909. E.g., the capacity of the capacitor 923 is 1.3 µF, whereas the capacity of the capacitor 924 is 4.5 µF.

The supply voltage 902 is applied to a switch 912. The switch 912 is part of the screen light drive device 913. The switch 912 is switched via the line 914 of the microprocessor 909. Thereby, the microprocessor 909, which also has access to the current supply voltage 902 via line 915, can determine whether sufficient power is available for operating the light generating device 916. In case of sufficient power being available, the microprocessor closes the switch 912 so that the supply voltage 902 reaches the screen light drive device 913. Via the step up circuit 917, the voltage is increased from 3 V to about 4.5 V. The Zener diodes 918 and 919 are for limiting a supply voltage for the light generating device 916.

The coil 920 is used for operating the step-up circuit. The capacitor 921 is for interference suppression of the circuit. The coil 920 has an inductance of 10 µH, whereas the capacitor 921 has a capacity of 4.7 µF. Due to voltage increase thereof, the step-up circuit 917 achieves even radiance of the light generating device 916. The resistor 922 is linked to the cathode LED 916, and limits the current through the light generating device 916.

The power storage 105 respectively energy storage 105 is connected in parallel to the light generating device 916, which is connected in series with the resistor 922. The power storage 105 is realized as a capacitor having a capacity of 1 µF, and can thus buffer surplus power. Thus, the light generating device 916 can also be supplied, when insufficient power is made available via line 902.

Due to the increased electrical consumption, losses occur at the explosion-proof resistors 908, 906 between sensor 901 and field unit screen 907. Thus, the screen 907 no longer has 3.0 V, but about 0.25 V less. As the screen 907 has a fourfold voltage multiplier 917 or a step-up circuit 917, the screen 907 thus changes 3 V into 12 V. The magnitude of the explosion-proof resistors 906 and 908 is 80Ω.

Figures 10, 11:
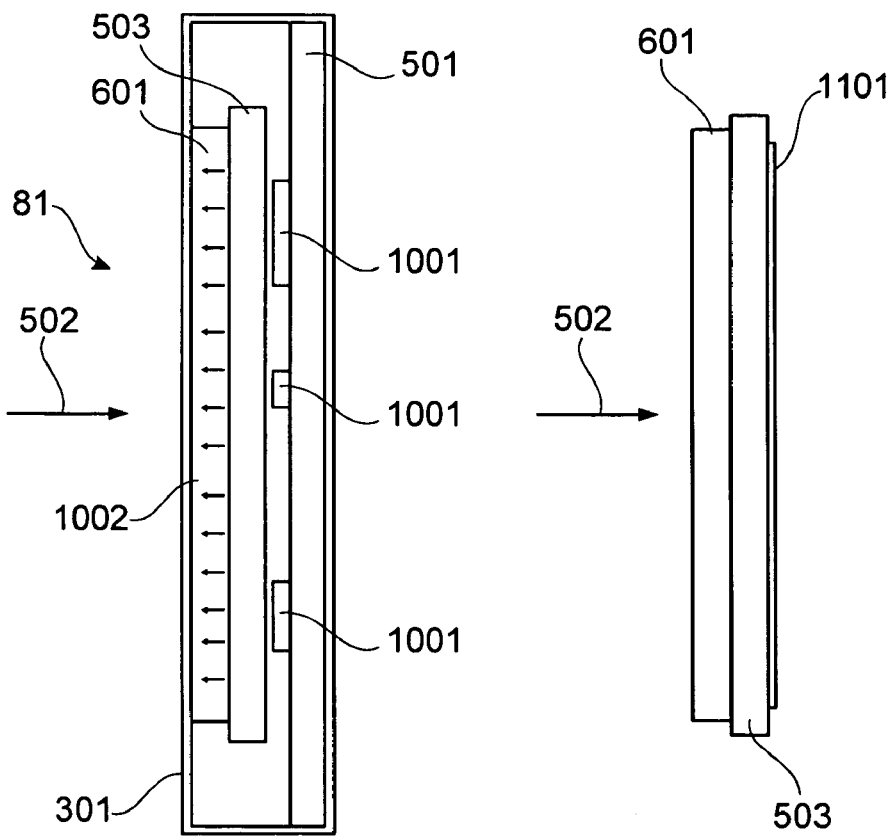
FIG. 10 shows a sectional illustration through a field unit screen with a light distribution device and a screen case according to an exemplary embodiment of the present invention.
FIG. 11 shows a sectional illustration through a field unit screen with a light distribution device and a heater according to an exemplary embodiment of the present invention.

FIG. 10 shows a sectional illustration through a field unit screen with a light distribution device with a screen case according to an exemplary embodiment of the present invention. Reading of the field unit screen 401 is then performed in reading direction 502. The screen module 601, in particular the LCD screen 601, is then irradiated with light from the light distribution device 503 opposite to the reading direction 502 in the direction 1002. The light distribution device 503 is located between the screen module 601 and the drive board 501. The distance between the light distribution device 503 and the circuit board 501 is chosen so that the components 1001 of the circuit board 501 fit between the circuit board 501 and the light distribution device 503.

The screen case 301 encapsulates the screen module 601, the light distribution device 503 and the circuit board 501, so that the field unit screen 401 forms a compact unit 401 respectively a compact module 401. In certain regions of the LCD screen module 601, the case 301 is made transparent or does not exist at all, in order to ensure readability.

FIG. 11 shows a sectional illustration through a field unit screen with a light distribution device and a heater. FIG. 11 shows the heater 1101, which is disposed similarly to the arrangement of the light distribution device 503, as seen in viewing direction 502 respectively reading direction 502, behind the LCD module 501 and thus behind the light distribution device 503. The heater 1101 can be another additional function for the screen light device 503, and serve for heating the screen module 601. Due to heating of the screen module 601, it is possible for crystals located in the screen module 601 to move faster, and consequently a faster display is possible.

Figure 12:
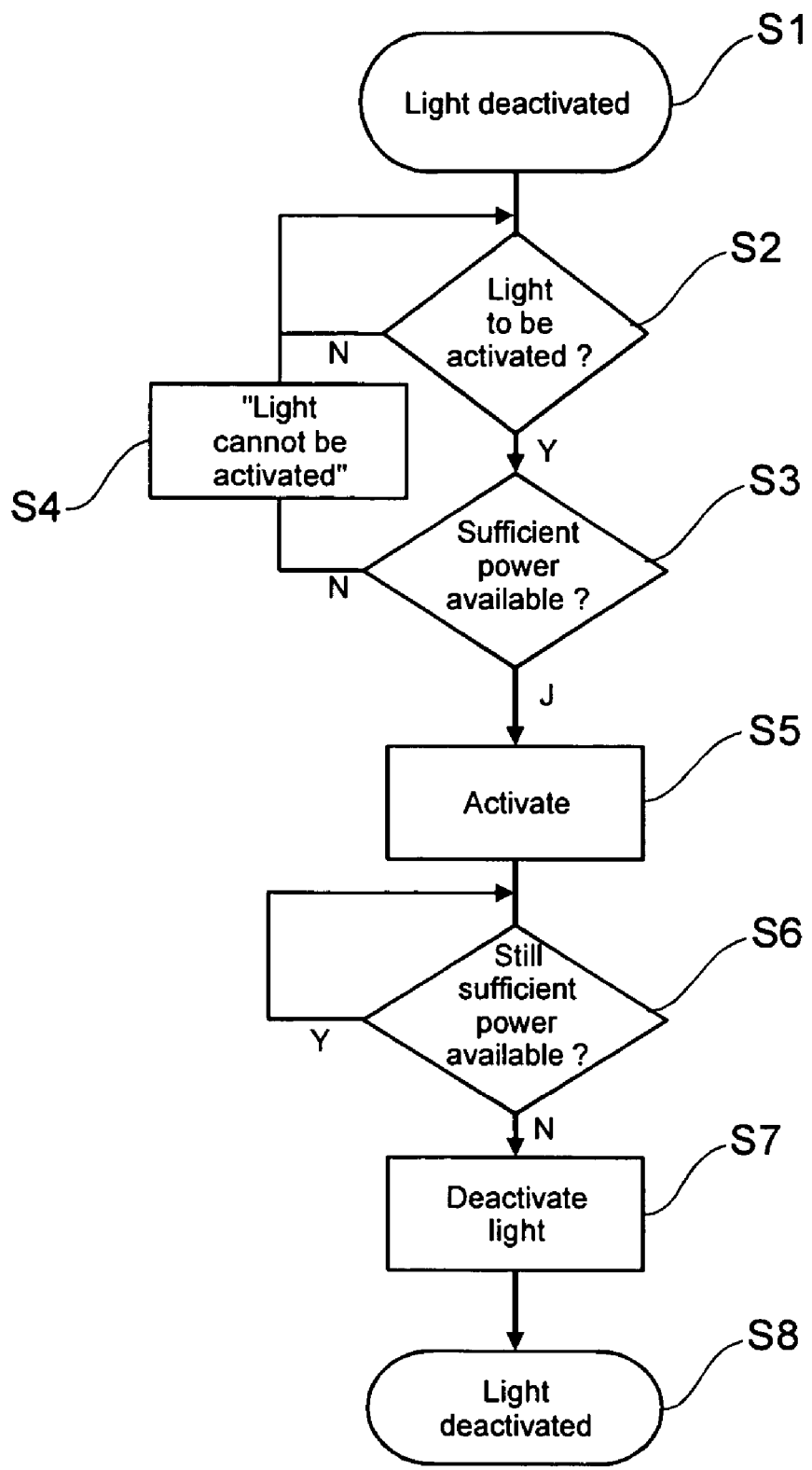
FIG. 12 shows a flowchart of a method for illuminating a field unit screen according to an exemplary embodiment of the present invention.

FIG. 12 shows a flowchart of a method for illuminating a field unit screen according to an exemplary embodiment of the present invention. The method starts at step S1 with a deactivated light, i.e. the light generating device is switched off. In step S2, a request is made whether the light is to be activated. When the light is not to be activated, the lighting arrangement stays in the deactivated state. If lighting is desired, in step S3, it is checked whether sufficient power is available for lighting.

If sufficient power is not available for lighting, then in step S4 an indication is inserted on the screen that the light cannot be activated. If sufficient power is available, then in step S5, an activation of the light takes place, whereby the screen is lighted.

During lighting, step S6 is constantly checking whether the available power is sufficient for lighting the screen. As long as sufficient power is available, the activated state is maintained.

If the power is no longer sufficient for lighting, then in step S7, a deactivation of the light takes place. The deactivation of the light can also be achieved after expiry of a time function element. Finally, in step S8, the light is again in the deactivated state.

Figure 13:
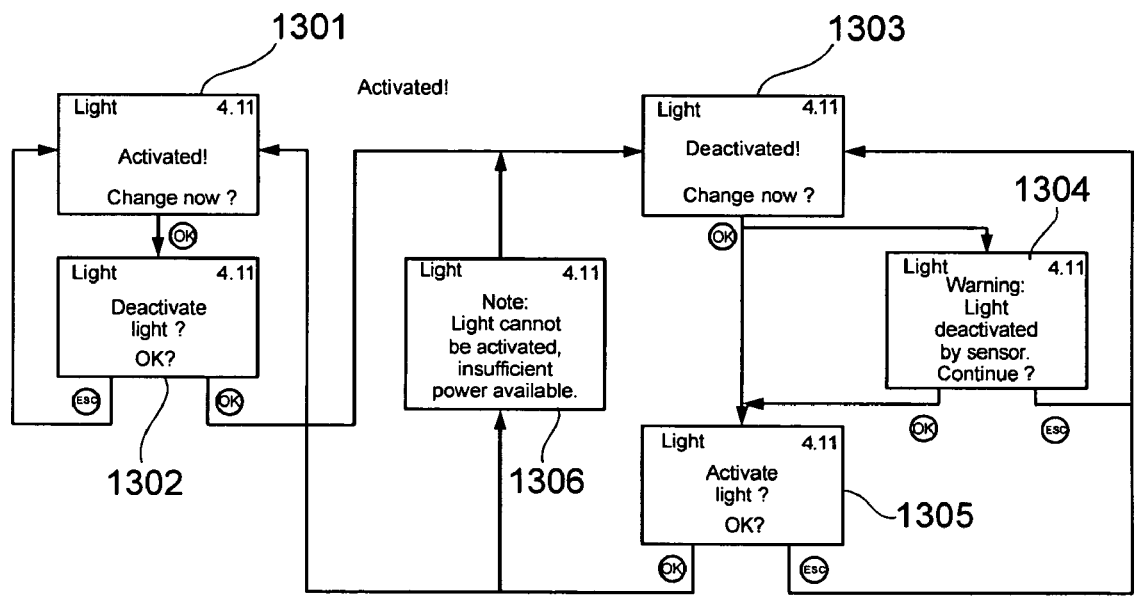
FIG. 13 shows a phase diagram for a method for illuminating a field unit screen according to an exemplary embodiment of the present invention.

FIG. 13 shows a phase diagram, in particular a menu structure for a method for illuminating a field unit screen according to an exemplary embodiment of the present invention. For lighting the display, one of the input devices 303 is arranged as an OK key, and another as an ESC key. In state 1301, lighting is activated, and "change now?" appears in the menu on the screen. If change is confirmed by means of pushing the OK key, at menu item 1302, it is checked whether the light is really to be deactivated. If the ESC key is pushed in state 1302, return to state 1301 takes place. If the request in state 1302 is confirmed with the OK key, a jump to state 1303 takes place, wherein the light is deactivated. The screen now shows the display "deactivated" and "change now?".

If in state 1303 the OK key is pushed, in state 1304 a display "Warning: Light deactivated by sensor" is performed on the screen. If in state 1304 the ESC key is pushed, a return to the deactivated state 1303 takes place. If in state 1304 the confirmation of the OK key takes place, then a return to state 1305 takes place, wherein the request "activate light" appears. If in this state 1305 the ESC key is pushed, a return to the deactivated state 1303 also takes place.

However, if in state 1305 the confirmation of the OK key takes place, it is checked whether sufficient power is available for operating a light. If sufficient power is available, then a return to the active state 1301 takes place, and in case insufficient power is available, a jump to state 1306 takes place. In state 1306 the screen shows the display "Note: light cannot be activated, insufficient power available" and after expiry of a time function element, a return to state 1303 takes place.

Additionally, it is to be noted that "comprising" does not exclude any other items or steps, and that "a" or "an" do not exclude a plurality. Furthermore, it is to be noted that features or steps having been described with reference to one of the above exemplary embodiments can also be used in combination with other features or steps of other embodiments described above. Reference numerals in the claims are not to be construed as limitations.

What is claimed is:

1. A circuit arrangement for a field unit, comprising:
   a power measuring device determining power existing in the field unit;
   a power distribution device determining if a surplus power exists for operating a screen light of a field unit screen in the field unit, wherein if a surplus power exists the power distribution device forwards the surplus power to a screen light drive device to operate the screen light, wherein if a surplus power does not exist, the power distribution device does not forward a surplus power to a screen light drive device; and
   a light selection device which recognizes whether lighting of the field unit screen is to take place, wherein, during a time in which the screen light is switched off by means of the light selection device, the surplus power is made available to other components,
   wherein the screen light drive device determines whether the surplus power is sufficient for lighting the field unit screen, to avoid failure of another function with higher priority due to screen lighting, and drives a luminous device of the field unit screen comprising the screen light, when sufficient power is available, and when, using the light selection device, it is detected that a display is to take place, wherein the screen light drive device deactivates the screen light if the surplus power is no longer sufficient for lighting.

2. The circuit arrangement according to claim 1, wherein the field unit is selected from a group composed of HART® 2-conductor field unit, HART® 4-conductor field unit, 4 to 20 mA field unit, Profibus field unit and Fieldbus Foundation field unit.

3. The circuit arrangement according to claim 1, wherein the power distribution device further comprising:
   an explosion-proof device limiting the surplus power so that the field unit is operable in an explosion-proof environment.

4. The circuit arrangement according to claim 1, wherein the power distribution device activates the screen light drive device.

5. The circuit arrangement according to claim 1, wherein the screen light drive device includes at least one of a constant-current source and a PWM drive device which operates the luminous device.

6. The circuit arrangement according to claim 1, wherein the screen light drive device includes an explosion-proof device which limits the surplus power so that the field unit is operable in an explosion-proof environment.

7. The circuit arrangement according to claim 1, further comprising:
   a power storage storing the surplus power.

8. A lighting arrangement for a field unit screen, comprising:
   a circuit arrangement according to claim 1; and
   a luminous device, comprising:
      a light generating device generating light;
      a light distribution device spatial distributing light, and
      a light selection device,
      wherein a shape of the light distribution device is adapted to a shape of a rear side of a field unit screen module,
      wherein the light selection device is a switch which recognizes whether lighting of the field unit screen is to take place, and
      wherein the light distribution device evenly distributes the light over the field unit screen module,
   wherein the power distribution device is coupled to the screen light drive device and
   wherein the screen light drive device is coupled to the luminous device.

9. A method for driving a luminous device for a field unit screen, comprising:
   measuring surplus power existing in a field unit;
   determining whether the existing surplus power is sufficient for lighting while avoiding failure of another function with higher priority due to screen lighting;
   recognizing using a light selection device whether lighting of the field unit screen is to take place, wherein, during a time the screen light is switched off by means of the light selection device, the surplus power is made available to other components;
   driving a luminous device for operation with the existing surplus power, when it has been determined that the existing surplus power is sufficient for lighting and when using the light selection device it is detected that a display is to take place; and
   deactivating the screen light if the surplus power is no longer sufficient for lighting.

10. A computer-readable non-transitory medium storing a program for driving a luminous device for a field unit screen, the program as being executed by a processor comprising:
   measuring surplus power existing in a field unit;
   determining whether the existing surplus power is sufficient for lighting while avoiding failure of another function with a higher priority due to screen lighting;
   recognizing, using a light selection device, whether lighting of the field unit screen is to take place, wherein, during a time in which the screen light is switched off by means of the light selection device the surplus power is made available to other components; and
   driving a luminous device for operation with the existing surplus power, when it has been determined that the existing surplus power is sufficient for lighting and when, using the light selection device, it is detected that a display is to take place, wherein the screen light drive device deactivates the screen light if the surplus power is no longer sufficient for lighting.

* * * * *